March 26, 1957   F. N. BARD   2,786,698
BALL RETAINED SWING JOINT
Filed Jan. 7, 1954
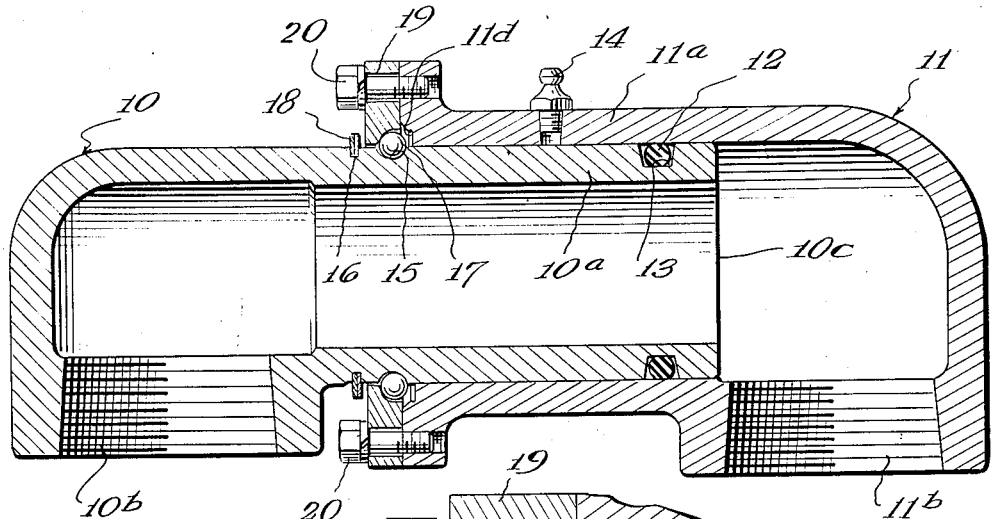
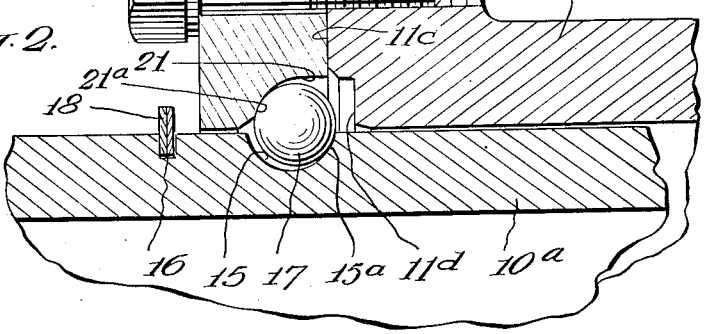
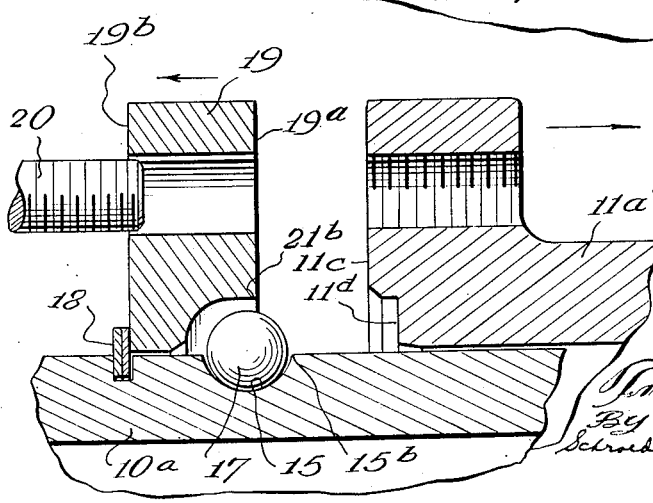
Inventor
Francis N. Bard
By Schroeder, Merriam, Hofgren & Brady
Attorneys

United States Patent Office 2,786,698
Patented Mar. 26, 1957

2,786,698

BALL RETAINED SWING JOINT

Francis N. Bard, Barrington, Ill.

Application January 7, 1954, Serial No. 402,673

2 Claims. (Cl. 285—276)

This invention relates to a pipe joint and more particularly to a swing joint.

The term swing joint is used herein to designate a flexible or rotatable joint which may have completely free rotation through 360° and which is particularly adapted for low speed or intermittent rotation. Such joints are commonly used in connection with loading or unloading lines, hose reels and the like. This type of joint is distinguished from revolving joints which are adapted to rotate continuously at high speeds.

It is particularly desirable in swing joints to provide low friction bearing surfaces, such as ball bearings, and further to so construct the joint that it may easily be disassembled to permit replacement of the seal, which may be an O ring. Swing joints available in the past which have utilized ball bearings have generally been unsatisfactory in this respect, in that either when the joint was disassembled the bearings would fall out, or that it required quite a bit of time to disassemble and reassemble such a joint.

I have devised and disclose and claim herein a novel swing joint utilizing ball bearings, and which may be disassembled without disturbing the bearing arrangement.

One feature of the swing joint is that it comprises a first pipe section provided with means for receiving bearing means, a second pipe section telescopically receiving the first pipe section, bearing ball means operably associated with the bearing receiving means, means readily detachably connectable to the second pipe section retaining the pipe sections in place and securing the bearing ball means, and means limiting the movement of the retaining means when disconnected from the second pipe section in such a manner that the bearing ball means are retained in the bearing receiving means.

Another feature is that the first pipe section has a circumferential groove cut therein which serves as a portion of a ball race for the bearing balls, the retaining means being an annular flange having a groove cut therein forming another portion of the ball race.

A further feature is that the first pipe section is provided with a pair of spaced circumferential grooves, the one of the grooves nearer the inner end of the pipe section forming a portion of a race for bearing balls, the second pipe section telescopically receives the first pipe section and extends to a point adjacent the ball race, a retainer flange is movably mounted on the first pipe section and detachably secured to the end of the second pipe section adjacent the ball race, providing a bearing surface for the bearing and retaining the pipe sections together. A snap ring is provided in the other of the grooves limiting movement of the retainer flange when disconnected from the second pipe section, retaining the balls in the ball race.

Still another feature of the invention comprises the method of assembling the swing joint including the steps of slipping the retainer flange over the first pipe section, inserting the bearing ball means, assembling the second pipe section and securing the flange thereto, and attaching stop means to the first pipe section, the stop means being so positioned as to limit movement of the flange when disconnected from the second pipe section so that the bearing ball means will not fall out.

Further features and advantages of the invention will readily be apparent from the following specification and from the drawings, in which:

Figure 1 is a longitudinal sectional view of a swing joint embodying the invention;

Figure 2 is an enlarged fragmentary sectional view of the bearing arrangement with the pipe sections secured together; and Figure 3 is a view similar to Figure 2 with the second pipe section detached from the retainer flange.

Referring now more particularly to the drawings, a first pipe section or sleeve 10 has an elongated cylindrical portion 10a which is telescopically received in a corresponding elongated cylindrical portion 11a of a second pipe section or casing 11. Both pipe sections may be of any suitable material such as cast iron, brass or the like. Pipe sections 10 and 11 are threaded at 10b and 11b respectively to permit coupling to further pipes, hoses or other desired apparatus.

The elongated cooperating sections 10a and 11a of pipe sections 10 and 11 have a fairly close but easily movable fit. The outer diameter of inner section 10a may be 0.01 to 0.02 inch less than the inner diameter of section 11a, for example. An O ring 12 is inserted in channel 13 cut in the outer surface of section 10a and adjacent the inner end 10c thereof, providing a seal between the pipe sections 10 and 11. (The term inner end is here used to designate the end of pipe section 10a which is inserted into pipe section 11a.) The long bearing surface between pipe sections 10a and 11a provides a sturdy joint with very little danger of canting and jamming or wobbling of the joint during use. A grease fitting 14 is provided in section 11a permitting lubrication of the joint.

A pair of spaced circumferential grooves 15 and 16 are provided in the outer surface of pipe section 10a and spaced from the inner end 10c thereof; the end 11c of pipe section 11 is positioned adjacent but not covering groove 15, which is nearer the inner end of pipe 10. Groove 15 which is generally semicircular in cross section is adapted to receive bearing means such as bearing balls 17 shown herein and provides a portion of the race therefor. Groove 16 is adapted to receive snap ring 18, the purpose of which will be described more fully later.

A retainer flange 19 encircles pipe section 10a and is readily detachably secured to pipe section 11a as by bolts 20. An arcuate groove 21 is cut in the edge of the inner surface of retainer flange 19 and forms another portion of the race for bearing balls 17. Groove 21 has a cross sectional configuration which is substantially that of a quadrant of a circle.

Inasmuch as fluids handled by such a pipe line are normally under pressure, and in addition, physical tension is often placed on the pipe system, the bearing balls 17 ride up on the side 15a of groove 15 and bear against portion 21a of groove 21 as shown in Figure 2. The end face of pipe section 11a is cut away at 11d to prevent contact between this end face and bearing balls 17 when the members of the pipe joint are in this normal position of the joint members.

It sometimes occurs, however, that the physical forces on the joint cause the joint members 10 and 11 to move in the opposite direction relative to each other. In this event it is preferable that the thrust forces be concentrated in the ball bearing; that is the retainer flange 19 should not come in contact with snap ring 18. To insure that this will not occur, the distance between the cut-away face 11d of pipe section 11a and the inner face of ball 17 (the face nearer the interior of the joint), the ball being at the side of groove 15 opposite to which it is shown in Figure 2, is less than the distance between the outer face 19b of flange 19 and snap ring 18.

In the event that the pipe joint must be disassembled, as for example when it is desired to replace O ring 12, bolts 20 may be removed and joint members 10 and 11 separated as indicated in Figure 3. This must be done as often as once a week in some applications where liquids are carried at high temperatures and pressures.

The movement of retainer flange 19 after it has been detached from pipe section 11 is limited by snap ring 18. The positioning of the stop means, snap ring 18, is so related to the other dimensions of the apparatus, the thickness of retainer flange 19, the radius of groove 21, the radius of groove 15 and the diameter of bearing balls 17, that balls 17 may not fall out of groove 15 when retainer flange 19 is fully retracted. In other words, the diameter of bearing balls 17 is greater than the distance between the edge 15b of groove 15 nearest end 10c of pipe section 10 and edge 21b of groove 21 on the inner face 19a of retainer flange 19, when retainer flange 19 is positioned against snap ring 18. In order to insure this condition, it is preferable to make the distance between inner face 19a of flange 19 and the center line of ball 17, when the parts are in the position shown in Figure 2, larger than the distance between the outer face 19b of the flange and snap ring 18. It is readily apparent that this joint may easily be disassembled and reassembled without the danger of the bearing means falling out.

The joint may initially be assembled very easily in the following manner. Flange 19 is slipped over portion 10a of pipe section 10, snap ring 18 not having been attached to the pipe section at this point. Retainer flange 19 is moved past the position shown in Figure 3, and the assembly is preferably held, as in a jig, in such a manner that the axis of pipe section 10 is vertical, with groove 21 opening upwardly. If retainer flange 19 is properly positioned, slightly below the point at which it would be stopped by snap ring 18 if it were in place, balls 17 may be dropped into the race formed by grooves 15 and 21. Should retainer flange 19 be positioned lower, balls 17 will be supported between edge 21b of groove 21 and the wall of pipe section 10a until the retainer flange is moved upwardly allowing the balls to fall into place. Retainer flange 19 is then moved back past groove 16 in order that snap ring 18 may be installed. The joint is then in the condition shown in Figure 3 and the second pipe section 11 may be added by slipping it over portion 10a of pipe section 10 and securing retainer flange 19 thereto with bolts 20.

While I have shown and described certain embodiments of my invention, it is to be understood that it is capable of many modifications. Changes therefore, in the construction and arrangement may be made without departing from the spirit and scope of the invention as disclosed in the appended claims.

I claim:

1. A swing joint of the character described, comprising: a first elongated cylindrical pipe section having an inner end and provided with a pair of spaced circumferential grooves spaced from said end, the one of said grooves nearer the inner end forming a portion of a race for bearing balls; a second elongated cylindrical pipe section adapted to receive said first pipe section with the adjacent elongated surfaces making a close but easily movable fit, preventing canting of the joint, the second pipe section enclosing the first pipe section to a joint adjacent said ball race and having an end face at said joint; a plurality of bearing balls in said race; a retainer flange movably mounted on said first pipe section and readily detachably securable to the end of said second pipe section adjacent said ball race providing a bearing surface for said joint, said flange having a groove in the edge of the inner surface thereof providing a bearing surface for said bearing balls, said retainer flange securing said pipe sections together; and a snap ring in the other of said grooves limiting movement of said retainer flange when disconnected from said second pipe section, the distance of movement of said bearing retaining means being less than that necessary to allow the bearing balls to fall out and greater than that necessary to allow the second pipe section end face to engage the bearing balls.

2. A swing joint of the character described in claim 1, wherein sealing means are provided adjacent the inner end of said first pipe section.

References Cited in the file of this patent
UNITED STATES PATENTS

| | | |
|---|---|---|
| 1,518,368 | Steed | Dec. 9, 1924 |
| 1,966,146 | Stanley | July 10, 1934 |
| 2,238,535 | Meyer et al. | Apr. 15, 1941 |
| 2,312,341 | King | Mar. 2, 1943 |
| 2,532,669 | Jones | Dec. 5, 1950 |
| 2,625,005 | Myers | Jan. 13, 1953 |